United States Patent Office 2,751,362
Patented June 19, 1956

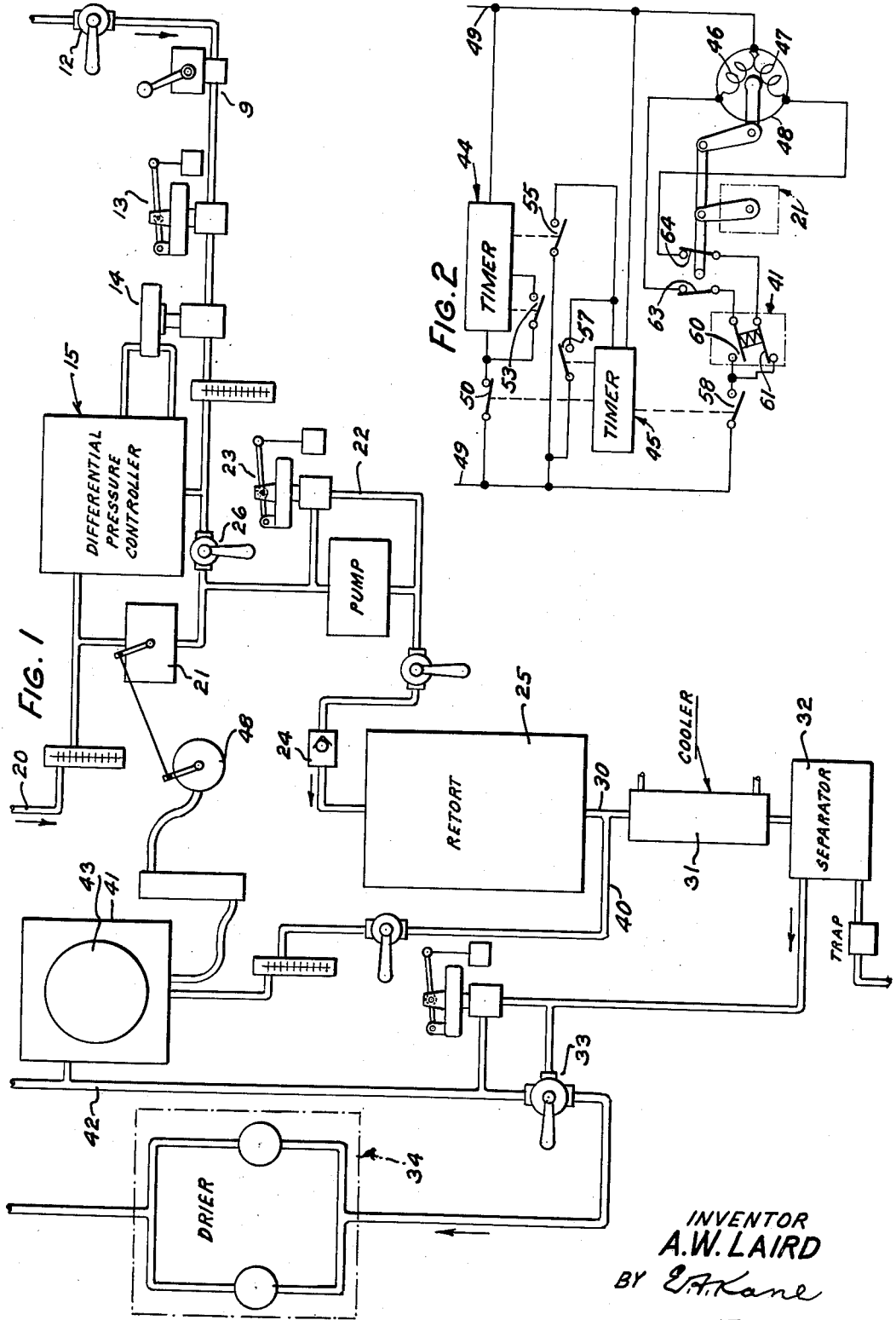

2,751,362
METHODS OF AND SYSTEMS FOR PRODUCING HEAT-TREATING GASES

Alfred W. Laird, Oak Park, Ill., assignor to Western Electric Company, Incorporated, New York, N. Y., a corporation of New York Application May 7, 1951, Serial No. 224,878

17 Claims. (Cl. 252—373)

This invention relates to methods of and systems for producing heat-treating gases, and more particularly to methods of and systems for producing protective gases for use in heat-treating steel articles.

In the past, heat-treating protecting gases composed of carbon monoxide, hydrogen and nitrogen have been produced by flowing hydrocarbon gases, such as natural gas, for example, and air over a hot nickel catalyst to form carbon monoxide, hydrogen and nitrogen. However, when these gases are passed over the catalyst, the temperature and proportions of the gases have been such that a slight amount of carbon is formed and deposits on the next catalyst, thereby clogging the apparatus. If the air is made higher in proportion to the hydrocarbon gas, carbon dioxide and water are produced, which, in quantities above 1%, have deleterious effects in many heat-treating processes, while a balance between the air and the hydrocarbon is impossible to maintain in production in quantities necessary for full scale heat-treating operations. Hence, the practice in the past has been to use slightly less air than is required to convert all of the carbon in the carbon monoxide with the consequent clogging of the apparatus with carbon.

An object of the invention is to provide new and improved methods of and systems for producing heat-treating gases.

Another object of the invention is to provide new and improved systems for and methods of producing protective gases for use in heat-treating steel articles.

Another object of the invention is to provide methods of and systems for producing heat-treating gases in which no carbon is deposited on the processing apparatus, and in which the produced gases include insufficient quantities of carbon dioxide and water to be harmful in the heat-treating processes for which they are intended.

A method illustrating certain features of the invention may include reacting a hydrocarbon gas and air continuously to produce carbon monoxide as the primary product. The air is supplied to the reaction slightly in excess of the minimum quantity necessary to prevent the deposition of carbon in processing apparatus in which the reaction takes place. The water produced by the excess air supplied to the reaction then may be removed and the gas used for heat-treating purposes.

A complete understanding of the invention may be obtained from the following detailed description of a method and a system forming specific embodiments of the invention, when read in conjunction with the appended drawing, in which:

Fig. 1 is a diagrammatic view of a system for practicing a method forming one embodiment of the invention, and Fig. 2 is a schematic view of a control circuit forming part of the system shown in Fig. 1.

Referring now in detail to the drawing, there is shown therein a system for producing a heat-treating gas from air, and a hydrocarbon gas, such as, for example, natural gas, artificial gas, or a gas such as methane, ethane, propane or butane, or a mixture of these hydrocarbons. The gas is advanced under a predetermined pressure from a supply line 10 by a pump 11 past a manually operable, shut-off valve 12, a pressure controlled shut-off valve 9, an adjustable reducing valve 13 and a diaphragm-actuated, adjustable reducing valve 14, which is controlled by a suitable differential pressure regulator 15 of a well-known type which maintains the pressure of the gas passing through the valve 14 at the same pressure as that of air which is drawn from a supply line 20 through a motor-adjustable reducing valve 21 of well-known construction. The air and gas mixture is pumped by the pump 11 around which a pressure relief line 22 controlled by a diaphragm controlled relief valve 23 is shunted to keep the pressure of the mixture of gas and air forced from the pump at a predetermined pressure, through manually adjustable flow control valve 26 and a fire protection valve 24 of standard construction to an externally heated retort 25.

The retort 25 is heated to a temperature such that a heated, finely divided nickel catalyst positioned within the retort heats the mixture to a temperature of at least 1600° F. and preferably about 1750° F., and the hydrocarbons in the gas are broken down to form carbon and hydrogen which react with the air in the mixture to form carbon monoxide, free hydrogen, free nitrogen, and slight amounts of carbon dioxide and water. The resulting heat-treating gas flows out of the retort 25 through a pipeline 30, a cooler 31, a separator 32, which takes out any condensed moisture, a three-way valve 33 and a dryer 34 of a commercial type, to a heat-treating chamber (not shown) of a heat-treating furnace in which various articles are being heat-treated. A slight amount of the heat-treating gas flows from the pipeline 30 through a pipeline 40, a continuous humidity measuring device 41, of a well-known, commercially available type, and a vent line 42 connected to a three-way valve 33. The valve 33 may be manually actuated to direct the gas to the dryer or the vent line. An oscilloscope 43 connected to the humidity measuring device 41 records the percentage of humidity in the heat-treating gas at each instant in the operation of the system.

Timers 44 and 45 control energization of windings 46 and 47 of a reversible motor 48. When the winding 46 is energized, the motor 48 gradually opens the valve 21, and the motor winding 47 gradually closes the valve 21 when energized. The timers are connected across conductors 49—49 of a powerline, and continuously cycle. A normally closed contact 50 openable by the timer 45 connects the timer 44 across the powerline, whereby the timer 44 is actuated to close a normally open contact 53. This starts the timer 44, which closes a normally open contact 55 after it has been energized a predetermined period of time. Closing of the contact 55 energizes the timer 45, which closes a holding contact 57 in parallel with the contact 55 to the timer 45. Closing of the contact 55 or the contact 57 energizes the timer 45, which shortly thereafter closes a normally open contact 58 and opens the contact 50 to drop out the timer 44, which resets to zero. A predetermined period of time later, the timer 45 opens the holding contact 57 and resets to zero. A switch 60 of the humidity measuring device 41 is closed if the moisture in the heat-treating gas is less than 0.1%, and a switch 61 of the device 41 is closed if the moisture in the heat-treating gas is greater than 0.4%.

When the motor winding 46 is energized it actuates the valve 21 to a more open condition until the timer 45 times out, thereby opening the holding contact 57, and resets to zero, which restarts the timer 44. More air then is supplied and shortly after the time the adjusted mixture has been processed in the retort and arrives at the oscilloscope, the timer 45 is operative. If there is less moisture than 0.1%, the oscilloscope keeps the switch 60 closed and the valve 21 is opened slightly further until the timer 45 times out. When the valve 21 is fully open, it opens a switch 63.

Whenever there is more than 0.4% moisture in the heat-treating gas, the oscilloscope closes the switch 61 to energize the winding 47 to gradually close the valve 21 until the timer 45 times out by opening the contact 57. Then the timer 44 runs, and times out to restart the timer 45. If the humidity is still above 0.4%, the winding 47 again is energized to again run the motor 46 very slowly for a short period of time to throttle the valve 21 slightly to reduce the quantity of air being supplied to the mixture. Whenever the valve 21 is throttled completely, it opens a switch 64.

Whenever the timer 45 is being operated, the motor 48 is responsive to closure of either of the switches 60 and 61. Conversely, the motor 48 cannot be energized while the timer 44 is being operated. Thus, overrunning and hunting are avoided. The timers 44 and 45 thus act in the manner such that clogging of the retort is prevented. Consequently, carbon dioxide in the heat-treating gas, being about the same per cent as that of the moisture, coming from the retort 25 is never zero, is substantially below 0.1%, and is never substantially higher than 0.3%. Consequently, there is never any free carbon in the mixture of gases flowing through the retort 25 so that no carbon is deposited on the nickel catalyst and clogging of the retort is prevented, and the proportion of the carbon dioxide is so low that it does not affect the various articles being heat-treated in heat-treating atmosphere produced by the above-described method.

The temperature of the mixture of the gases in the retort 25 and the proportion of air to gas are kept sufficiently high that the reverse reaction of carbon monoxide to free carbon does not occur in the retort, the quanity of air being just sufficiently in excess of the hydrocarbon gas that sooting out is prevented. The cooler 31 cools the gas forced from the retort sufficiently rapidly to prevent the formation of free carbon and carbon dioxide from the carbon monoxide therein, and the temperature thereof while in the retort is maintained too high for this reaction to take place.

In one specific example of the above-described method, natural gas of about 90% methane was mixed with air and forced through the retort 25 at a temperature of about 1750° F., and the proportion of air to gas was kept within such limits that the combined total of carbon dioxide and water of the resulting heat-treating gas never approached the upper limit of 1% or the lower limit of 0%.

The term "hydrocarbon gas," as it is used throughout the specification and claims, is intended to be generic to the low molecular weight hydrocarbons such as butane, propane, ethane and methane, and also to carbon monoxide and to exclude the higher hydrocarbons such as octane and the higher homologues.

It is to be understod that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of producing heat-treating gases, which comprises continuously mixing air and a hydrocarbon gas together, forcing the resulting mixture against and past a heated nicked catalyst bed to form carbon monoxide and slight amounts of carbon dioxide and water, continuously measuring the percentage of water in the resulting product, and regulating the flow of one of the hydrocarbon gas and air to keep a slight amount of water in the resulting product and to keep this amount at a minimum.

2. The method of producing heat-treating gases, which comprises continuously mixing air and a hydrocarbon gas together, forcing the resulting mixture against and past a heated nickel catalyst bed to form carbon monoxide and slight amounts of carbon dioxide and water, continuously measuring the percentage of water in the resulting product, regulating the flow of one of the hydrocarbon gas and air to keep a slight amount of water in the resulting product and to keep this amount at a minimum, and removing water from the resulting product.

3. The method of producing heat-treating gases, which comprises continuously mixing air and a hydrocarbon gas together, forcing the resulting mixture against and past a heated nickel catalyst bed to form carbon monoxide and slight amounts of carbon dioxide and water, continuously measuring the percentage of water in the resulting product, regulating the flow of the air to keep a slight amount of water in the resulting product and to keep this amount at a minimum, and removing water from the resulting product.

4. The method of producing heat-treating gases, which comprises continuously supplying air and a hydrocarbon gas and mixing them together, passing the resulting mixture over a heated catalyst to break down the constituents of the gas and to convert them into free hydrogen and carbon monoxide preponderantly and water and carbon dioxide slightly to form a heat-treating gas, continuously measuring the proportion of one of the carbon dioxide and the water with respect to the whole of the heat-treating gas, and regulating the supply of one of the air and the gas to maintain the amount of air supplied slightly in excess of that required to convert all the carbon to carbon monoxide to maintain a trace of water and carbon dioxide in the heat-treating gas.

5. The method of producing heat-treating gases, which comprises continuously forcing a hydrocarbon gas over a nickel catalyst maintained at a temperature over 1650° F. to break down the hydrocarbon constituents of the gas, continuously forcing air into the hydrocarbon gas before the gas is forced over the catalyst in such quantity with respect to that of the gas that all the carbon is converted into carbon oxides and a trace of water is formed to form a heat-treating gas, continuously measuring the percentage of water in the heat-treating gas, and regulating the amount of air supplied to the hydrocarbon gas in accordance with the measurement of the water to maintain just a slight trace of water in the heat-treating gas.

6. The method of producing heat-treating gases, which comprises continuously supplying air and a hydrocarbon gas and mixing them together, passing the resulting mixture over a heated catalyst to break down the constituents of the gas and to convert them into free hydrogen and carbon monoxide preponderantly and water and carbon dioxide slightly to form a heat-treating gas, continuously measuring the proportion of one of the carbon dioxide and the water with respect to the whole of the heat-treating gas, regulating the supply of one of the air and the gas to maintain the amount of air supplied slightly in excess of that required to convert all the carbon to carbon monoxide to maintain a trace of water and carbon dioxide in the heat-treating gas, and removing the water from the heat-treating gas.

7. The method of producing heat-treating gases, which comprises continuously forcing a hydrocarbon gas over a nickel catalyst maintained at a temperature over 1650° F. to break down the hydrocarbon constituents of the gas, continuously forcing air into the hydrocarbon gas before the gas is forced over the catalyst in such quantity with respect to that of the gas that all the carbon is converted into carbon oxides and a trace of water is formed to form a heat-treating gas, continuously measuring the percentage of water in the heat-treating gas, regulating the amount of air supplied to the hydrocarbon gas in accordance with the measurement of the water to maintain just a slight trace of water in the heat-treating gas, and removing the water from the heat-treating gas.

8. The method of producing heat-treating gases, which comprises continuously supplying air and a hydrocarbon gas and mixing them together, passing the resulting mixture over a heated catalyst to break down the constituents of the gas and to convert them into free hydrogen and carbon monoxide preponderantly and water and carbon dioxide slightly to form a heat-treating gas, continuously measuring the proportion of the water with respect to the whole of the heat-treating gas, and regulating the supply of the air to maintain the amount of air supplied slightly in excess of that required to convert all the carbon to carbon monoxide to maintain a trace of water and carbon dioxide in the heat-treating gas as it comes from the catalyst.

9. A system for producing heat-treating gases, comprising a retort for cracking a hydrocarbon gas, an air line, a hydrocarbon gas line, means for pumping air and gas from the lines to and through the retort, means continuously measuring the amount of one of carbon dioxide and moisture in the gas emerging from the retort, means for controlling the proportions of the air and the hydrocarbon gas supplied to the retort, and means responsive to the measuring means for actuating the controlling means to supply such relative quantities of the air and the gas that a slight amount of moisture is in the resulting gas.

10. A system for producing heat-treating gases, which comprises a retort for converting air and a hydrocarbon gas to carbon monoxide, hydrogen and nitrogen and for creating carbon dioxide and moisture in proportion to any excess of air beyond that necessary to create carbon monoxide from the carbon atoms in the hydrocarbon gas, means for continuously supplying air to the retort, means for continuously supplying hydrocarbon to the retort, means for withdrawing heat-treating gas from the retort, means for measuring the relative amount of moisture in the heat-treating gas, and means responsive to the measuring means for regulating the air-supplying means to keep the air and the hydrocarbon gas in such proportions that only a slight amount of moisture is formed.

11. A system for producing heat-treating gas, comprising a heated retort for cracking a hydrocarbon gas, an air line, a hydrocarbon gas line, a supply line extending from said lines to the retort, automatic means for maintaining equal the pressure of the gas and air supplied to the supply line, means for pumping air and gas from the supply line to and through the retort, means for continuously measuring the moisture content of the gas emerging from the retort, means for controlling the proportions of the air and the hydrocarbon gas supplied to the retort, and means responsive to the measuring means for actuating the controlling means.

12. A system for producing heat-treating gas, which comprises a heated retort for cracking a hydrocarbon gas, a supply line extending to the retort, an air line connected to the supply line, a flow-regulating valve in the air line, a hydrocarbon gas line connected to the supply line, means for pumping air and gas through the supply line to and through the retort, means continuously measuring the moisture content of the gaseous mixture emerging from the retort, means for adjusting the flow-regulating valve to control the proportion of the air with respect to the hydrocarbon gas supplied to the retort, and means responsive to the measuring means for adjusting the actuating means.

13. A system for producing heat-treating gas, which comprises a retort having a passage therethrough for converting air and a hydrocarbon gas to hydrogen, carbon oxides, water and nitrogen, a hydrocarbon gas line, an air line, a pipe line connecting the lines together and to one end of the passage in the retort, a pump positioned in the pipe line for pumping air and hydrocarbon gas through the retort, differential pressure controlled means for keeping equal the pressures of the air and gas supplied to the pipe line, an adjustable flow-controlling valve positioned in one of the air line and the gas for controlling flow therethrough, a reversible electric motor for adjusting the valve, means for continuously measuring the proportion of moisture in the mixture emerging from the retort, means responsive to the measuring means for actuating the motor for a predetermined period of time, and means for preventing operation of the actuating means during a predetermined period of time after it has operated.

14. A system for producing heat-treating gas, comprising a retort having a passage therethrough for creating carbon oxide and water from air and a hydrocarbon gas, a hydrocarbon gas line, an air line, means for pumping air and hydrocarbon gas from said lines to and through the retort, an adjustable flow-regulating valve positioned in one of the air line and the gas line for controlling flow therethrough, means for continuously measuring the moisture content in the mixture emerging from the retort, means responsive to the measuring means for opening the valve when the moisture content is below a predetermined amount, and means for throttling the valve when the moisture content is above a predetermined amount.

15. A system for producing heat-treating gases, which comprises an externally heated retort for cracking a hydrocarbon gas, a supply of hydrocarbon gas, a supply of air, means for pumping the gas and air from the supplies thereof to and through the retort, means for measuring the percentage of moisture in the mixture coming from the retort, means for regulating the flow of one of the gas and the air to the retort, means responsive to the moisture-measuring means for operating the regulating means, and timing means for alternately preventing operation of the operating means and permitting operation of the operating means.

16. A system for producing heat-treating gas, comprising a retort having a passage therethrough for creating carbon oxide and water from air and a hydrocarbon gas, a hydrocarbon gas line, an air line, means for pumping air and hydrocarbon gas from said lines to and through the retort, an adjustable flow-regulating valve positioned in the air line for controlling flow therethrough, a reversible electric motor having a throttling winding and an opening winding for adjusting the valve, means for continuously measuring the moisture content in the mixture emerging from the retort, a source of electric current, a switch in series with the current source and the throttling winding closable by the measuring means when the moisture content is above a predetermined amount, a second switch in series with the current source and the opening winding closable by the measuring means when the moisture content is less than a predetermined amount, a third switch in series with said switches and the current source, and timing means for alternately opening the third switch for a predetermined period of time and closing the third switch for a predetermined period of time to prevent hunting.

17. A system for producing heat-treating gas, comprising a cracking retort having a passage therethrough for creating carbon oxide and water from air and a hydrocarbon gas, a hydrocarbon gas line, an air line, means for pumping air and hydrocarbon gas through the retort, an adjustable flow-regulating valve positioned in the air line and the gas line for controlling flow therethrough, a reversible electric motor for adjusting the valve, means for continuously measuring the moisture content in the mixture emerging from the retort, a current source, a switch in series with the current source and the motor for actuating the motor to move the valve toward a throttling condition, a second switch in series with the current source and the motor for actuating the motor to move the valve toward an open condition, a third switch in series with the first-mentioned switches and the current source, and interrupting means for alternately holding the third switch open and closed.

References Cited in the file of this patent

UNITED STATES PATENTS

| | | |
|---|---|---|
| 1,644,123 | Griswold | Oct. 4, 1927 |
| 1,709,042 | Siebert | Apr. 16, 1929 |
| 1,770,059 | Barber | July 8, 1930 |
| 2,344,770 | Gunness | Mar. 21, 1944 |
| 2,552,107 | Miller et al. | May 8, 1951 |
| 2,603,608 | Lewis et al. | July 15, 1952 |

OTHER REFERENCES

Mayland et al.: "Thermodynamic Study of Synthesis Gas Production From Methane," Chem. Eng. Progress, July 1949, vol. 45, No. 7, pgs. 452–458.